INVENTOR:
WILLIAM F. SMITH
BY
Curtis, Morris & Safford.
ATTORNEYS.

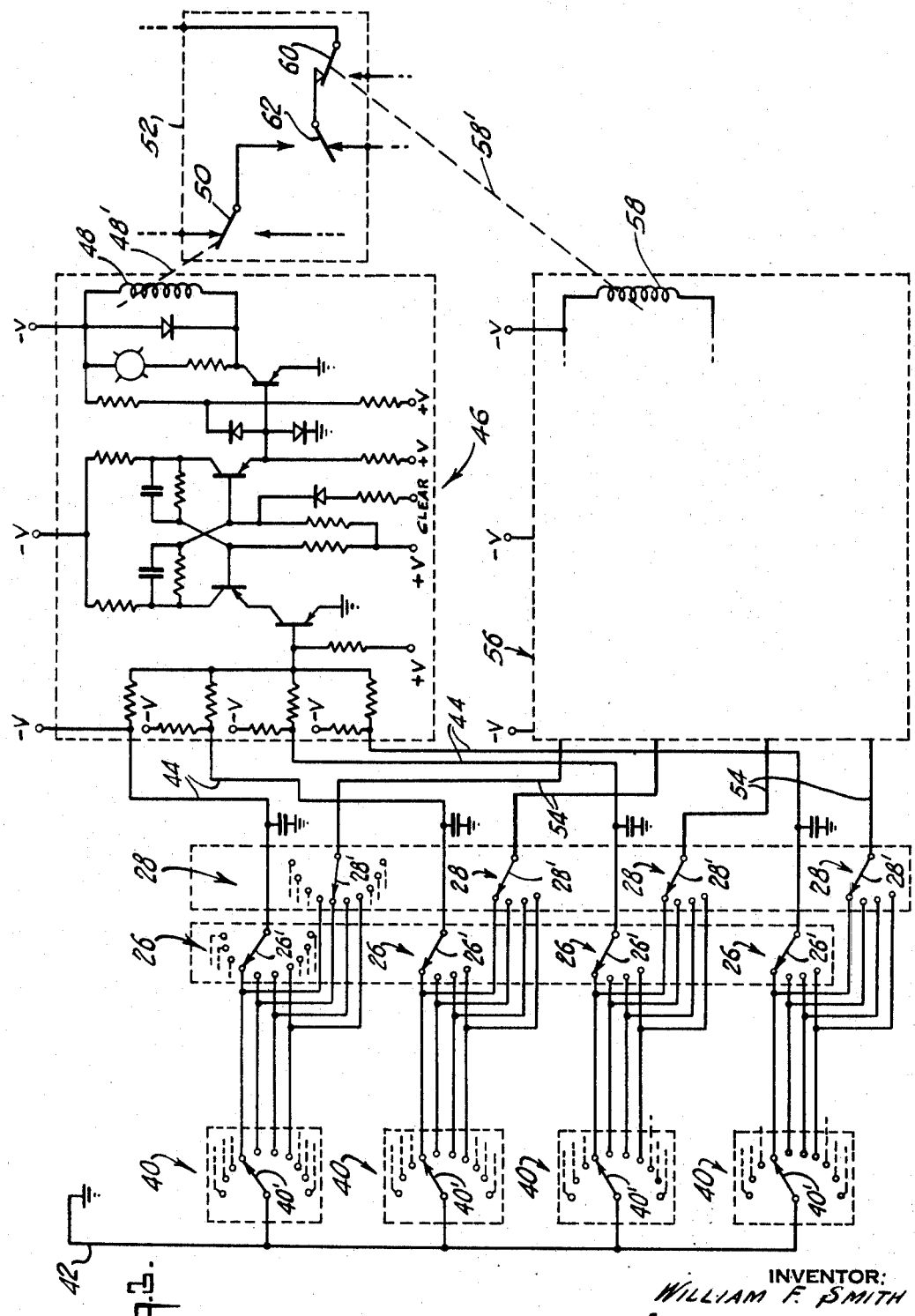

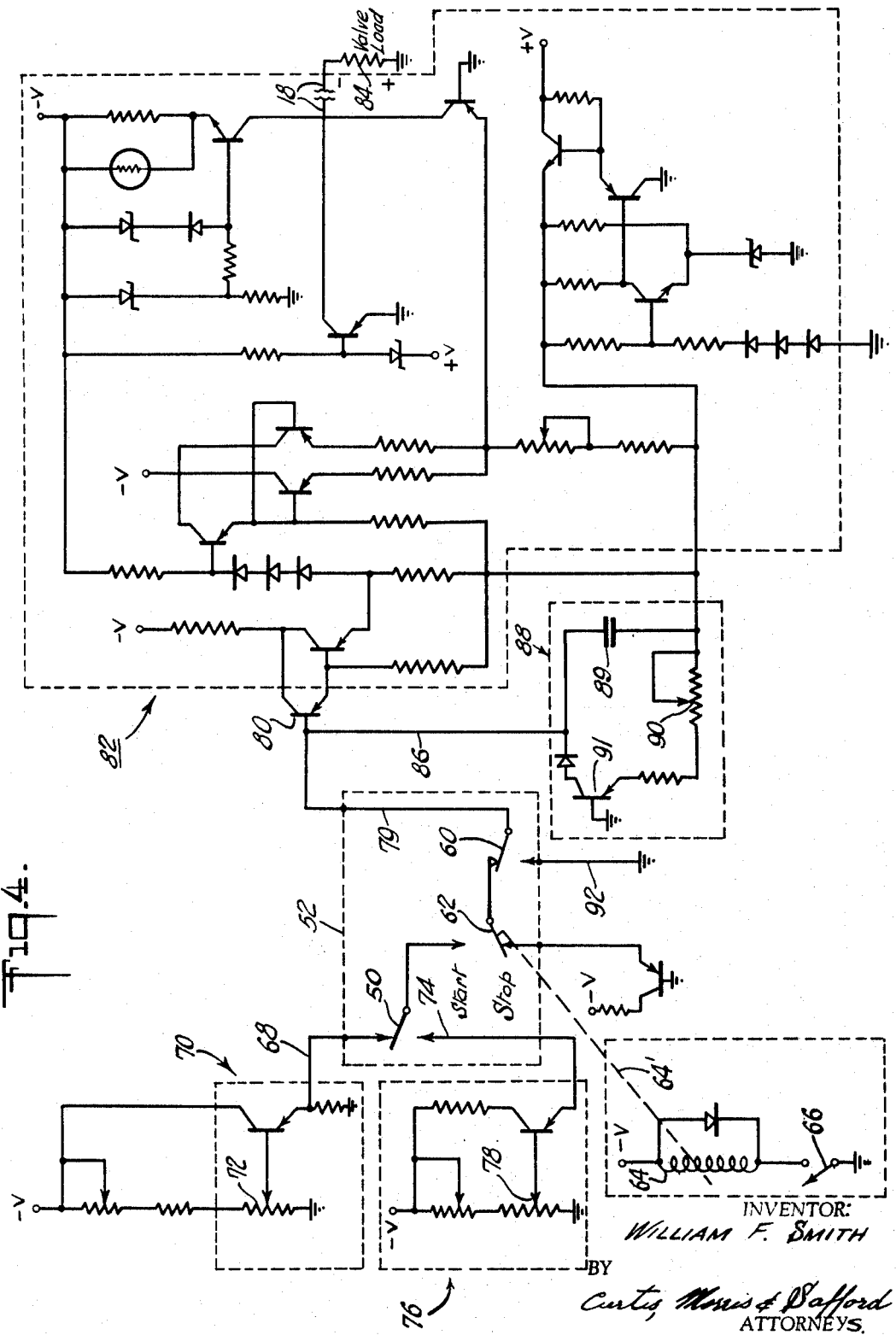

United States Patent Office 3,386,620
Patented June 4, 1968

3,386,620
ELECTRONIC VALVE CONTROL SYSTEM WITH REDUCED FLOW AT END OF CYCLE
William F. Smith, Saugus, Calif., assignor to The Foxboro Company, Foxboro, Mass.
Filed Oct. 14, 1966, Ser. No. 586,742
7 Claims. (Cl. 222—20)

ABSTRACT OF THE DISCLOSURE

A batch-controller system wherein a flow meter produces a series of electric pulses each representing a particular quantity of material, the controller including a series of stepping switches which are advanced by the pulses applied thereto so as to indicate total flow, the controller further including an amplifier producing a DC valve control signal which at the start of operations opens the valve to a maximum flow position, there being provided control means responsive to the indicated total flow and operative gradually to change the valve control signal to a pre-shutdown level where the valve is opened a very small amount, and thereafter change the control signal to a level shutting the valve fully when the desired batch amount has been transferred.

---

This invention relates to an electronic valve control system.

An object of this invention is to provide a more versatile control system for a large valve, such as used in industrial processes.

A further object is to provide a valve controlling circuit able to close a large valve quickly without overshoot or harmful suddenness and yet with extremely precise timing.

Still another object is to provide such a circuit which is easily adjustable and yet relatively simple and inexpensive.

These and other objects will be understood from or pointed out in the following description.

An industrial facility, such as an oil refinery or a chemical manufacturing plant, as a routine matter must control the flow of large volumes of liquids in accurately measured amounts. The turning on and off of the various pipelines is handled by large valves which, desirably, are remotely controlled from a central station. The present invention is directed to a system for automatically opening and closing these large pipeline valves in a way which is extremely accurate, fast and yet avoids sudden surges in pressure.

In accordance with the present invention, in one specific embodiment thereof, there is provided as part of a valve control system a programmable electronic circuit which can open and close a valve or valves from a remote station. The circuit is settable, by finger-operated dial switches, to meter through the valve a precisely measured amount of flow, then to close the valve down to nearly closed condition. Finally when the flow through the valve reaches a desired total, the circuit completely closes the valve. By programming the close-down of the valve in this manner, very precise metering of total flow is achieved, yet the elapsed time required to accumulate a given total flow is kept short. In addition, because closedown of the valve is at a controlled rate, sudden surges of pressure (i.e., "water-hammer" effect) in the line are avoided.

Figure 1:
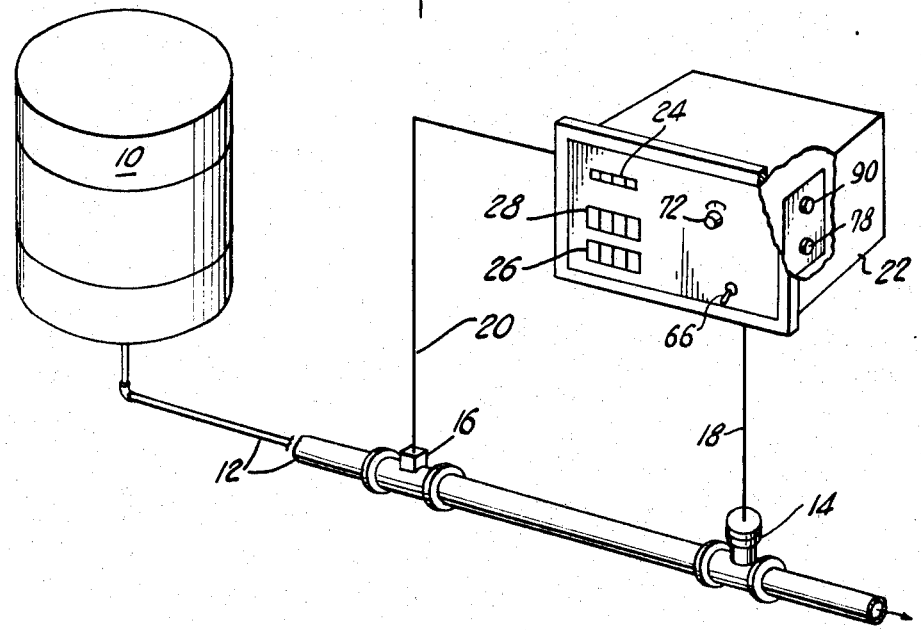
Figure 2:
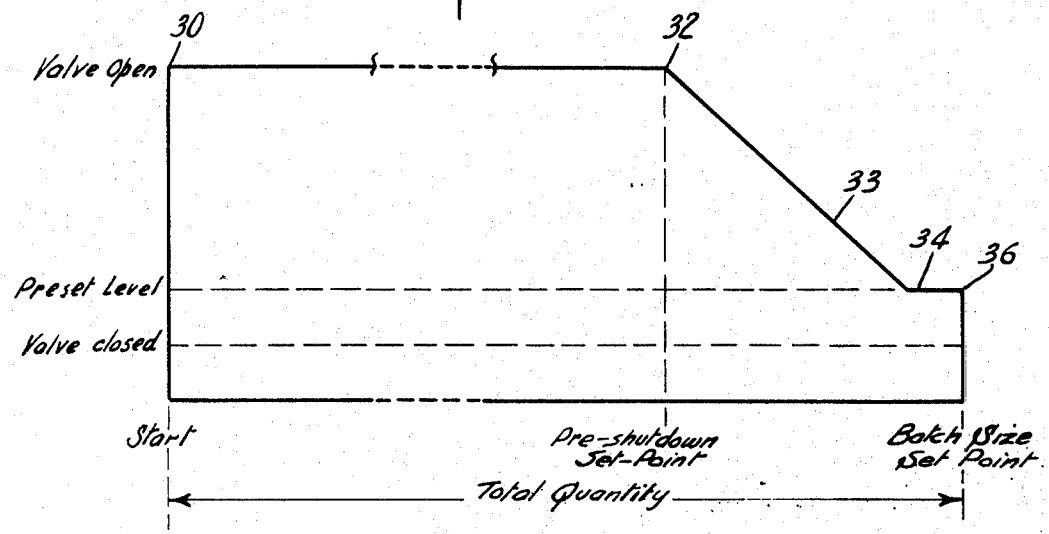

A better understanding of the invention, together with a fuller appreciation of its many advantages will best be gained from the following description given in connection with the accompanying drawings wherein:

FIGURE 1 is a schematic drawing of a pipeline and valve control system showing an electronic controller embodying the invention, FIGURE 2 is a diagram illustrating how flow through the valve is controlled according to the invention, FIGURE 3 is a circuit diagram showing part of the controller, and FIGURE 4 is a circuit diagram showing another part of the controller.

The arrangement shown in FIGURE 1 comprises a liquid storage tank 10 to which is connected a large pipeline 12, part of which is drawn in smaller scale. The pipeline has a valve 14 and a flow meter 16, which are connected by electric lines 18 and 20, respectively, to an electronic controller 22. Flow through the pipeline is measured by meter 16 which transmits to controller 22 a series of pulses, the number of which is proportional to the total flow through the line. Valve 14 opens or closes in response to signal currents applied to it via line 18 from controller 22. The valve is represented as a load resistor connected across the output of controller 22, as will be explained in greater detail in connection with FIGURE 4.

The front panel of controller 22 has a digital meter 24 which gives a reading in engineering units proportional to the number of pulses received by the controller from flow meter 16. The construction of meter 24, and the counter circuitry which drives it are conventional and therefore will not be described in great detail. For the sake of illustration, meter 24 has four readout dials, each of which can read 0 through 9. Associated with each dial, as will be explained in connection with FIGURE 3, is a ten position switch, the contacts of which correspond to the numbers 0 through 9 respectively.

Also on the front panel of controller 22 below meter 24 is a first row of finger-operated rotary switches 26, here illustrated with four dials, corresponding to the dials of meter 24. Each switch 26 is settable to a position 0 through 9. Using these switches, the operator dials into controller 22 the flow in gallons which should pass through valve 14 before the valve is closed to a nearly closed condition. These switches 26 will be termed the "Pre-shutdown" switches.

Above switches 26 is a second, similar row of switches 28. Each switch 28 can be set to a position 0 through 9. With switches 28, the operator dials into controller 22 the total flow desired, which when achieved will cause valve 14 to be completely closed. Switches 28 will be termed the "Batch Size" switches.

As shown in FIGURE 2, at the start of a flow cycle, indicated by number 30, valve 14 is fully opened. As the flow through it continues, a certain quantity is reached which corresponds to the previously set amount dialed into controller 22 by pre-shutdown switches 26. Thereupon at the point indicated by number 32, controller 22 applies to the valve a closing signal which closes the valve along a linear ramp 33 to a nearly closed, pre-set level 34. After a short interval of time, during which flow slowly accumulates to the total quantity previously dialed into controller 22 by "Batch Size" switches 28, the valve is finally closed at point 36. This mode of operation results in very precise control, yet economizes on the time required to accumulate a total flow. As will be explained in more detail in connection with FIGURES 3 and 4, the rate at which valve 14 is closed from fully open to the nearly closed, pre-set level shown in FIGURE 2 is adjustable. Thus the valve can be made to close quickly but not so quickly as to cause harmful pressure surges in any given installation.

FIGURES 3 and 4 show interconnected parts of the circuit of controller 22 and accordingly will be described together. The circuit is arranged as follows. At the left in FIGURE 3 is a vertical row of four switches 40, each of which has ten positions, and which correspond to the numbers 0 through 9 of the four dials of digital meter 24. These switches have contact arms 40′ which count in turn (like the dials of an automobile odometer) in response to pulses applied from controller 22. As shown schematically in FIGURE 3, to the right of switches 40 are the pre-shutdown switches 26 whose contacts are wired to respective ones of switches 40. Each switch 26 has a contact arm 26′ which can be manually set to any contact position. For the sake of illustration each contact arm 40′ is shown on the fourth contact position of its switch, and similarly each arm 26′ is shown set at its fourth contact position.

When the setting of each contact arm 40′ matches that of the respective arm 26′, the circuit begins its pre-shutdown phase, as illustrated by point 32 in FIGURE 2. As shown in FIGURE 3, each arm 40′ is connected to a ground line 42, and each arm 26′ is connected via a respective one of leads 44 to a flip-flop circuit generally indicated at 46. When all of leads 44 are grounded, through switches 40 and 26, flip-flop 46 reverses its state and applies current to a relay coil 48 connected in the right-hand side of FIGURE 3. Coil 48, as indicated by dotted line 48′, controls a double throw switch arm 50, and when the coil is energized, the arm 50 is moved down from the position shown in FIGURE 3. Switch arm 50, and two others to be described presently, are shown enclosed in a dotted box 52 which also appears in the left center of FIGURE 4.

FIGURE 3 shows dial switches 28 positioned in a vertical column to the right of switches 26. The ten contact of each switch 28 are connected in parallel respectively with those of switches 26. When all of contact arms 40′ match the settings of arms 28′ the latter will all become grounded. It should be noted here that whereas the three lower arms 28′ are shown matched with the three lower arms 40′, the uppermost arm 28′ is in its fifth position and therefore arm 40′ does not yet match it.

Each arm 28′ is connected to a respective one of leads 54 which run to a flip-flop circuit generally indicated at 56. The latter, which is identical to flip-flop 46, controls a relay coil 58, and when all of leads 54 become grounded, the coil is energized. Coil 58, as indicated by dotted line 58′, actuates a double throw switch arm 60 inside box 52. When the coil is energized arm 60 is pulled down from the position shown.

Dotted box 52 is also shown in FIGURE 4 to which the reader's attention is now invited. Switch arm 50 is connected to the upper contact of a double throw switch arm 62 which, as indicated by dotted line 64′, is controlled by a relay coil 64. The latter is energized by a manual "start" switch 66 mounted on the front panel of controller 22. When start relay 64 is energized, switch arm 62 is moved up from the position shown in FIGURE 4 into contact with switch arm 50.

In its upper position, switch arm 50 connects to a lead 68, the potential of which is adjustable by means of a variable bias circuit generally indicated at 70 and including a potentiometer 72. The latter is manually adjustable from the front panel of controller 22. The potential on lead 68 sets the hold-open signal current for valve 14, as illustrated by point 30 in FIGURE 2.

Now, when pre-shutdown point 32 is reached, switch arm 50 shown in FIGURE 4 is pulled down from the position shown into contact with a lead 74. The latter runs to an adjustable bias circuit, generally indicated at 76 and containing a potentiometer 78. The setting of this potentiometer, which is accessible from a panel behind the front panel of controller 22, determines the almost-closed, preset level of valve 14 indicated by line 34 in FIGURE 2.

As seen in FIGURE 4, switch 60 in its upper position connects to switch arm 62 and through it to lead 68 or lead 74 via switch arm 50. Switch arm 60 is connected via a lead 79 to the input transistor 80 of a valve-control amplifier which is a voltage to current converter generally indicated at 82. The output of this amplifier, shown at the right of FIGURE 4, connects to electric lead 18 and to valve 14, the electric load of which is illustrated by resistor 84 in FIGURE 4.

The input transistor 80 of amplifier 82 is biased by the potential set on lead 79 by means of circuits 70 or 76 and a ramp-controlling circuit 88 to be described. The output of amplifier 82 is a current proportional to the potential on lead 79, and is directed to the valve load represented by resistor 84.

The circuit generally indicated at 88 controls the slope of the ramp 33. This slope is adjustable by a potentiometer 90 which is accessible from behind the front panel of the controller. The circuit includes a capacitor 89 which serves as a storage element acting via lead 86 on the valve amplifier input transistor 80. Potentiometer 90 controls the current flow through a constant current sink comprising a transistor 91 which acts with the capacitor 89 to set the desired ramp rate. The potential on lead 79 is caused by the circuit 88 connected to lead 86 to decrease linearly from the "hold open" level established by circuit 70 to the nearly closed level pre-set by circuit 76. This produces a corresponding linear change in the output signal over leads 18 to the valve 14, the electrical load of which is represented by resistor 84 in FIGURE 4.

If the start relay 64 (FIGURE 4) is deenergized at any time after the start point 30 (FIGURE 2) and before reaching the batch size set point 36, the valve 14 will close fully at the ramp controlled rate set by potentiometer 90.

When final shutdown point 36 is reached, all of switch arms 40′ in FIGURE 3 will match the settings of switch arms 28′. This, as explained above, will actuate flip-flop 56 and cause switch arm 60 to move down from the position shown. Referring to FIGURE 4, when switch arm 60 is moved down, it will contact a lead 92 which is grounded. This will cause amplifier 82 to turn valve 14 completely off.

The controller described herein also may include a frequency-to-DC converter to produce a current signal representing actual flow through the pipe. This current signal can be used to actuate a front panel indicator (not shown) or alternately is switchable to the output circuit of amplifier 82 to observe the valve current. The controller also advantageously includes a conventional adjustable scaler circuit to convert the flowmeter pulses into engineering units (decimal) suitable for permitting the digital meter 24 to give direct readings in such scale factors as pounds, gallons, barrels, etc.

The above description is intended in illustration and not in limitation of the invention. Various changes in the embodiment shown may occur to those skilled in the art, and can be made without departing from the spirit or scope of the invention as set forth.

What is claimed is:

1. An automatic control system for metering a predetermined batch of material through a flow channel extending from a source of supply to a receiving container, said control system comprising valve means operable to control the rate of flow through said flow channel in accordance with the valve positioning, said valve means including valve setting means responsive to an applied control signal and operable to set the flow valve to a position corresponding to the signal magnitude; a flow measuring device at said flow channel for producing a measurement signal indicating the quantity of flow therethrough; a controller coupled to said measuring device to receive said measurement signal and having signal-producing means to develop the control signal for operating said valve means; means connecting said controller to said valve means to transmit said control signal thereto for positioning the valve in said flow channel; said controller further including:

first signal-setting means coupled to said signal-producing means to fix the magnitude of said control signal to a first level appropriate for effecting the transfer of substantially all of said batch of material to said receiving container at a relatively high flow rate;

first pre-settable control means responsive to said measurement signal and coupled to said signal-producing means; said first pre-settable control means including means operable, when a predetermined initial amount of said material has flowed through said channel, to smoothly alter the magnitude of said control signal in a fixed pattern from said first level and in a direction to close said valve, said first pre-settable control means further including means for adjusting said pattern by changing the rate-of-change of said control signal as it is controllably varied from said first level;

second signal-setting means coupled to said signal-producing means and operable when said control signal has been altered by said first pre-settable control means through said fixed pattern and to a predetermined new level, said second signal-setting means including means for holding said control signal at said new level to continue the transfer of said material at a substantially reduced rate;

and second pre-settable control means responsive to said measurement signal and coupled to said signal-producing means; said second pre-settable control means being operable, when the full amount of said batch of material has passed through said flow channel, to change said control signal rapidly to a level shutting said valve fully so as to prevent any excess flow of material beyond the desired batch amount thereof.

2. The control system of claim 1, wherein said signal-producing means is operable to produce a direct-current electric signal, said valve setting means being responsive to said direct-current signal for effecting control over the flow valve.

3. The control system of claim 2, wherein the flow measuring device produces a measurement signal in the form of discrete pulses each representing a fixed amount of material, said controller including a flow totalizer responsive to said pulses and adapted to produce an output indication of the total quantity of material which has passed through the flow channel, said first and second pre-settable control means being responsive to the output indication of said totalizer.

4. The control system of claim 2, wherein said first pre-settable control means includes ramp-generating means to change said current with a uniform rate-of-change throughout the variation from said first level to said new level, and means for adjusting said rate-of-change to any desired value within a predetermined range of values.

5. In a valve control system of the character described, an electronic controller comprising totalizer means responsive to a measurement signal for producing an indication of total quantity of flow, an amplifier circuit forming part of said controller and arranged to produce a current signal the magnitude of which determines the degree to which a flow valve is to be opened; first control means for setting the magnitude of said current to correspond to a desired normal opening of the valve for permitting flow therethrough at a relatively high rate; second control means coupled to said totalizer means and operative, when the indicated total quantity reaches a predetermined pre-shutdown amount, to smoothly change said current to a new level corresponding to a small opening of said valve; and third control means coupled to said totalizer means and operative, when the indicated total quantity of material reaches a predetermined desired batch size, to change said current rapidly to a level shutting the valve completely.

6. The apparatus of claim 5, wherein said totalizer means comprises a plurality of stepping switch means responsive to pulses derived from a flow measuring device, said first and second control means each including a set of manually positionable coincidence switches connected to said stepping switch means and arranged to produce characteristic circuit conditions when the stepping switch means reaches a corresponding position.

7. The apparatus of claim 5, wherein said second control means includes means to change said current in a linear fashion from its original level to the new level; and adjustment means for altering the rate-of-change of said current throughout a given range.

References Cited

UNITED STATES PATENTS

| | | | |
|---|---|---|---|
| 2,846,119 | 8/1958 | Robbins | 222—20 |
| 3,185,344 | 5/1965 | Kenney | 141—128 X |
| 3,211,332 | 10/1965 | Thielen | 222—20 |
| 3,307,824 | 3/1967 | Weisheit | 251—131 |

SAMUEL F. COLEMAN, *Primary Examiner.*